June 4, 1940.   H. E. TAUTZ   2,202,878
DRILL PRESS GUARD
Filed June 1, 1937
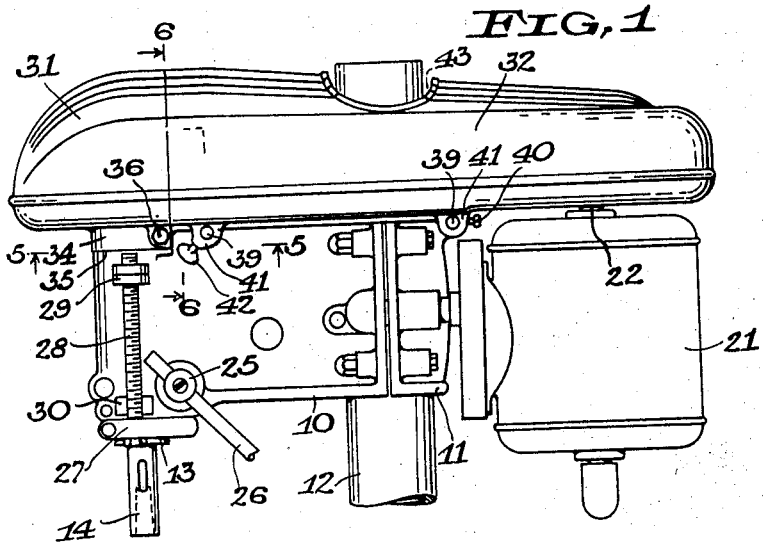
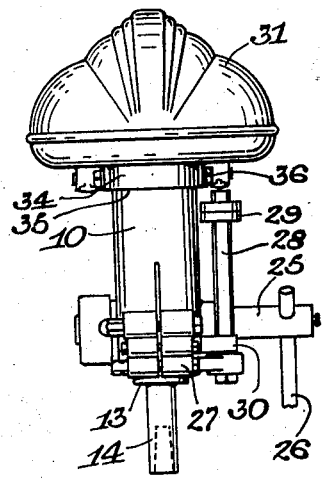
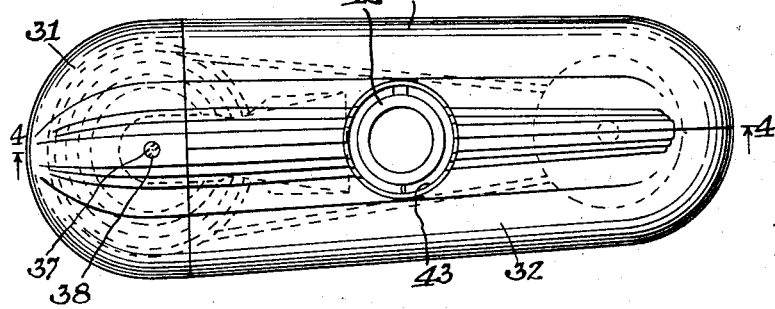
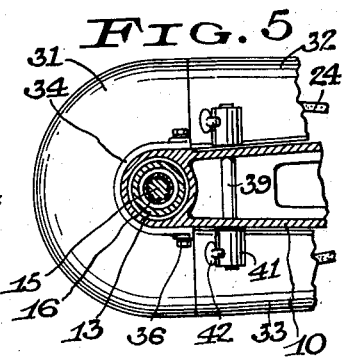
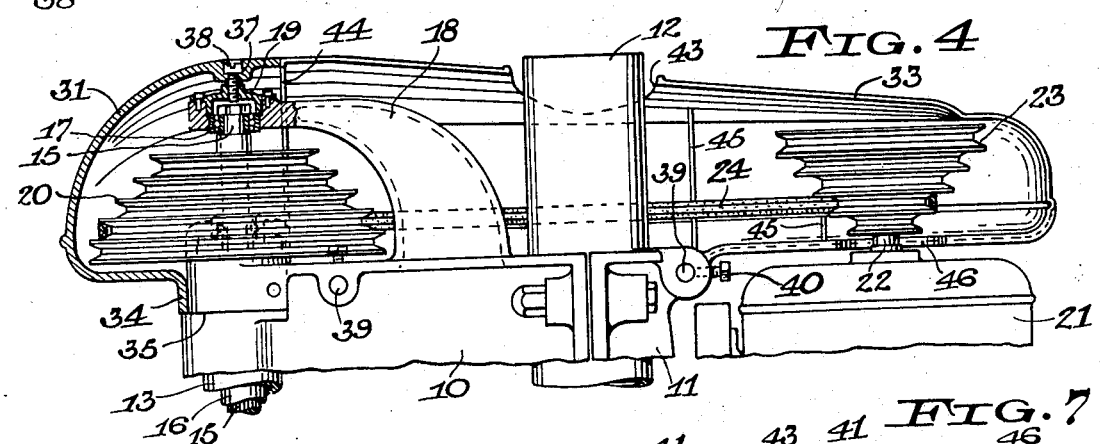
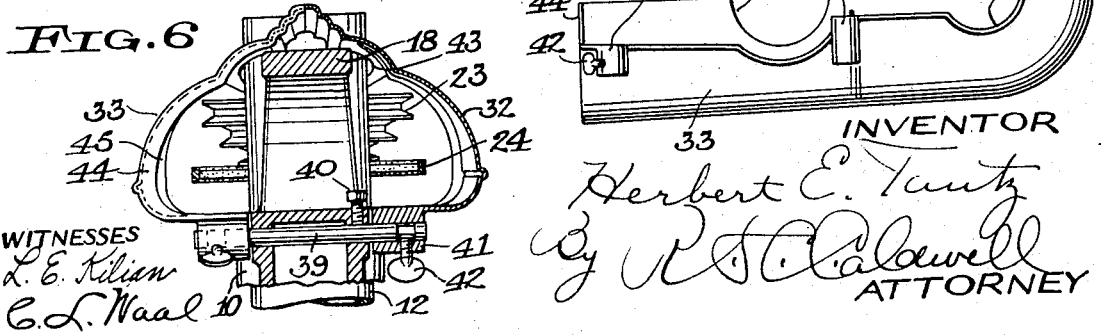
INVENTOR
Herbert E. Tautz
By R. S. Caldwell
ATTORNEY
WITNESSES
L. E. Kilian
C. L. Waal Patented June 4, 1940

2,202,878

UNITED STATES PATENT OFFICE 2,202,878

DRILL PRESS GUARD

Herbert E. Tautz, Milwaukee, Wis., assignor to The Delta Manufacturing Company, Milwaukee, Wis., a corporation of Wisconsin Application June 1, 1937, Serial No. 145,713

6 Claims. (Cl. 74—611)

The invention relates to machinery guards and more particularly to guards for drill presses and the like.

In a certain type of drill press, a head is adjustably mounted on a columnar support and carries a spindle which has a belt drive with an electric motor attached to the head, the belt being shiftable on stepped pulleys to vary the spindle speed. In some instances, the shaft for the driven pulley is supported on an outer bearing above the pulley.

It is sometimes necessary or desirable to guard the belt drive of the drill press, and it is an object of the present invention to provide improved guard means of simple, neat and inexpensive construction for enclosing and adequately protecting the belt drive.

Another object of the invention is to provide guard means capable of easy mounting and dismounting to permit quick and convenient shifting and replacement of the belt.

A further object is to provide belt-guarding means which will not interfere with the slidable mounting of the spindle-carrying head on its columnar support.

The invention further consists in the several features hereinafter described and claimed.

One embodiment of the invention is shown in the accompanying drawing, wherein

Fig. 1 is a side elevation of a drill press equipped with guard means of the invention;

Fig. 2 is a front elevation of the drill press;

Fig. 3 is a top plan view of the drill press;

Fig. 4 is a sectional elevation taken generally along the line 4—4 of Fig. 3;

Fig. 5 is a sectional view taken generally along the line 5—5 of Fig. 1;

Fig. 6 is a sectional elevation taken generally along the line 6—6 of Fig. 1, and Fig. 7 is a detail bottom view of one of the guards.

In the drawing, 10 designates a drill press head including a clamping cap 11 by which the head is adjustably mounted on a columnar support 12. A vertical quill 13 is slidable in the head and has journalled therein a downwardly projecting spindle 14 adapted to carry thereon a drill or other tool, not shown. A pulley shaft 15 coaxial with the spindle has a splined or other suitable driving connection with a sleeve 16 forming an upper extension of the spindle. The pulley shaft 15 is journalled in the head, the upper end of the pulley shaft being mounted in a ball bearing 17 carried in an overhanging cantilever arm 18 formed integral with the upper portion of the head. The ball bearing 17 is held in place by a cover plate 19 secured to the arm. A stepped pulley 20 is secured on the shaft 15 below the bearing 17.

An electric motor 21 is adjustably secured to the head cap 11 and has a vertical shaft 22 the upper end of which carries a stepped pulley 23. The pulleys 20 and 23 are here shown to be of the grooved type and are connected by a V-belt 24 which is shiftable to selected pulley grooves to vary the speed of the spindle. The columnar support 12 is between the pulleys, and the belt passes on opposite sides of the support.

The drill press head is provided with any suitable means for advancing the spindle, here shown to include a cross shaft 25 carrying a hand lever 26. The lower end of the quill carries a collar 27 to which is secured an upstanding gage rod 28 provided with adjustable stop nuts 29 engageable with a forked stop abutment 30 formed on the head.

The head is generally mounted on the columnar support with the spindle projecting downwardly, but in some instances the head is mounted in inverted position, as when it is used to form a shaper. If desired, the head can also be placed in various other positions by changing the position or angle of the support 12.

In order to protect the machine operator and nearby persons from injury, and also to protect the mechanism, the belt drive for the drill press is enclosed by guard means comprising a front end guard 31 and two side guards 32 and 33, the three guards forming a housing for the belt drive.

The front end guard 31 guards or houses the pulley 20 and is preferably a hollow casting open at the rear and having a downturned flange 34 at its bottom forming a rounded rearwardly opening recess. The flange 34 embraces the rounded upper front portion of the drill press head 10 and rests on a shoulder or ledge 35 formed on the head. Screws 36 pass through the opposite side portions of the flange 34 and are tapped into the head. The upper portion of the guard 31 overlies the arm 18 of the head and has a counterbored opening 37 receiving an attaching screw 38 which is tapped into the bearing cover 19, as seen in Fig. 4.

The head 10 carries thereon at opposite sides of its upper portion a pair of spaced, parallel, horizontal cross rods 39 which are secured in place by set screws 40, one of the rods being carried by the cap 11 of the head. The side guards 32 and 33, each of which is of channel-shaped cross-section, form rearward continuations of the front end guard 31 and in many instances may be formed of die-castings. At their bottom portions the longitudinal edges of the side guards 32 and 33 extend close to the side edges of the head and are each provided with apertured lugs 41 which slidably fit on the projecting ends of the cross rods 39. At least one lug of each guard, here shown to be the front lug, is provided with a thumb screw 42 to secure the guard in place. The longitudinal edges of the top walls of the side guards are substantially in abutment, and are provided with registering semi-cylindrical notches 43 to form a circular opening through which the columnar support 12 may extend. Each of the side guards 32 and 33 is here shown to have a front reenforcing flange 44 and two intermediate reenforcing ribs 45. The bottom walls of the guards 32 and 33 extend under the pulleys and belt and have registering notches 46 forming a passage for the motor shaft 22.

When it becomes necessary to shift the belt 24 for changing the spindle speed, one of the side guards 32 and 33 is laterally removed after loosening its thumb screw 42, and is replaced after the belt-shifting operation. In some instances, both of the side guards may be removed. When it eventually becomes necessary to replace the belt, the front end guard 31 is also removed after unscrewing the screws 36 and 38, it being unnecessary to disturb any part of the driving mechanism. The removal and replacement of any of the guards is quickly and easily effected. While it would be possible to hinge the side guards, it is preferable to have them completely removable for best access to the belt drive and to avoid danger of bending or breakage.

The drill press head is here shown to have one driving pulley and one driven pulley, but in some cases the head may be further provided with an intermediate pulley, as is well understood in this art.

What I claim as new and desire to secure by Letters Patent is:

1. The combination, with a spindle-carrying head having a belt drive thereon including driving and driven pulleys, of an end guard secured to said head to house the driven pulley, and a pair of complementary opposed side guards of channel cross-section secured to said head to house the driving pulley and belt and extending to said end guard, each side guard extending over and under the belt, at least one of said side guards being movable laterally of said head for access to the drive, and said head and last-named side guard having interengageable parts for supporting and positioning said side guard.

2. The combination, with a spindle-carrying head having driving and driven pulleys and a belt connecting said pulleys, of supporting projections on opposite sides of said head and extending transversely of the pulley axes, an end guard secured to said head to house the driven pulley, and a pair of complementary side guards detachably secured and laterally movable on said projections to house the driving pulley and belt and extending to said end guard, each side guard extending over and under the belt, and a longitudinal edge of each side guard extending along said head in close proximity thereto.

3. The combination, with a support and a spindle-carrying head adjustable on said support and having a belt drive, of guard means for said drive including a pair of opposed laterally movable side guards of channel cross-section having registering recesses in their longitudinal edges to form an aperture for receiving therethrough said support, and means for detachably securing said side guards to said head.

4. The combination, with a spindle-carrying head having a belt drive, of guard means for said drive including a pair of opposed side guards of channel cross-section secured to said head, said head and side guards having interengageable parts for supporting said guards, and each side guard extending over and under the belt of said drive, at least one of said side guards being laterally movable for access to said drive, and means for detachably securing said side guard to said head.

5. The combination, with a head having a spindle with a belt drive and having lateral projections extending transversely of the spindle, of guard means for said drive including a side guard slidable on said projections for access to the drive, and means for detachably securing said guard to said head, said side guard extending over and under the belt of said drive and having a longitudinal edge extending along said head in close proximity thereto.

6. The combination, with a head having a spindle with a belt drive, of a pair of parallel cross rods secured in said head and projecting laterally from opposite sides of said head and extending transversely of the spindle, guard means for said drive including a pair of opposed side guards slidable on said rods and independently movable therefrom laterally of said head for access to the drive, and means for detachably securing said guards on one of said rods, each side guard having upper and lower longitudinal edges, the upper longitudinal edges of the mounted opposed side guards being adjacent to each other, and the lower longitudinal edges thereof extending along said head in close proximity thereto.

HERBERT E. TAUTZ.